INVENTOR.
ADAM D. GOETTL

April 5, 1960  A. D. GOETTL  2,931,066
MEANS AND METHOD FOR CASTING RELATIVELY PIVOTAL
ELEMENTS AROUND SPHERICAL BEARING MEMBERS
Filed July 31, 1958  4 Sheets-Sheet 2

INVENTOR.
ADAM D. GOETTL
BY
Wm. H. Dean
AGENT

INVENTOR.
ADAM D. GOETTL
BY Wm. H. Dean
AGENT

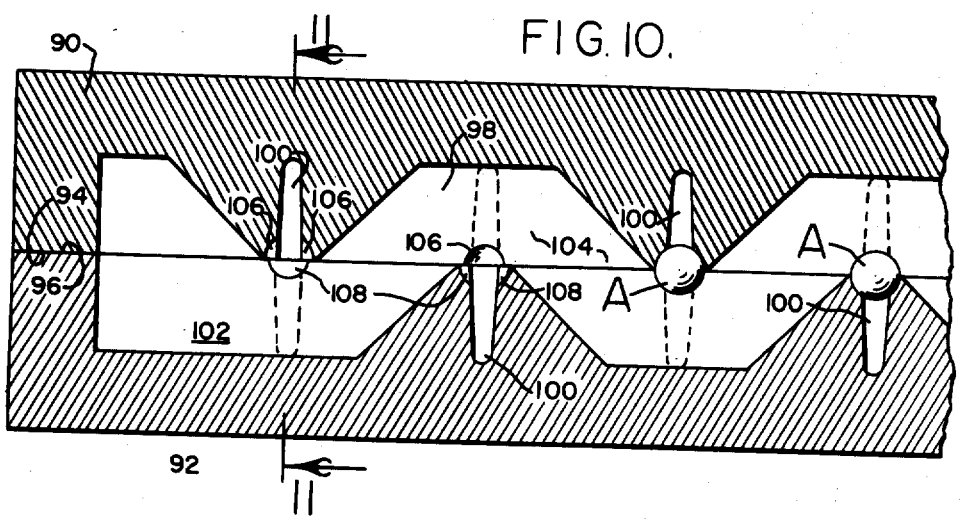
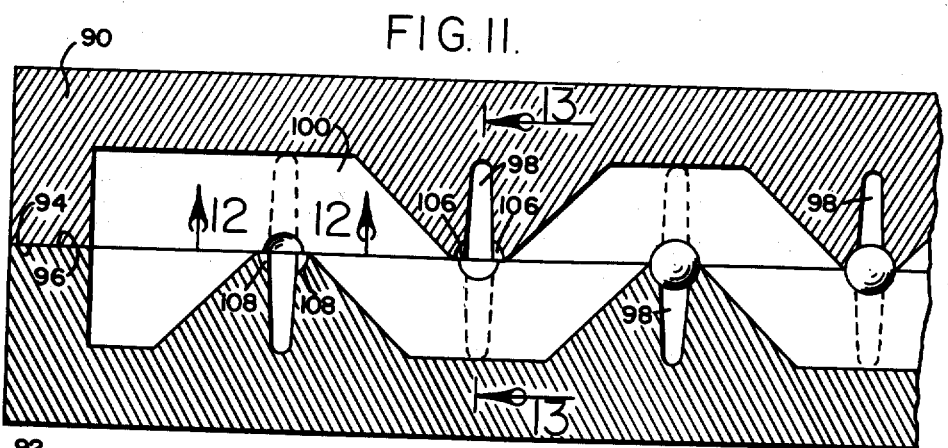
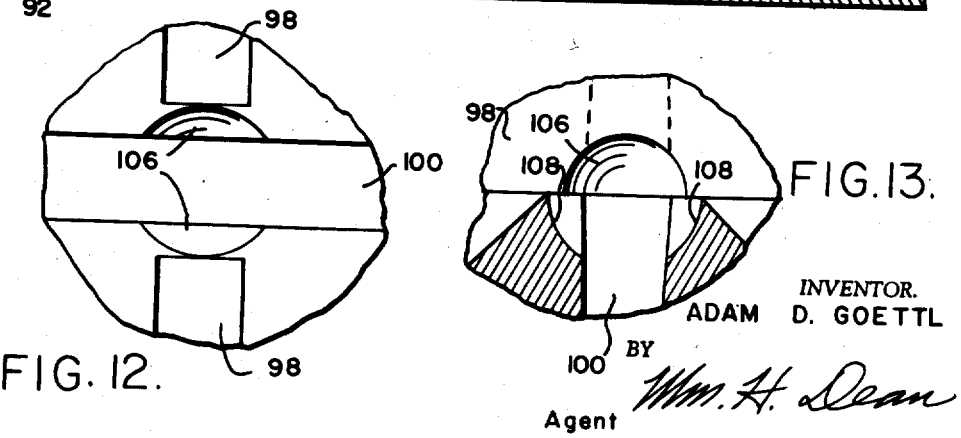

United States Patent Office 2,931,066
Patented Apr. 5, 1960

2,931,066

MEANS AND METHOD FOR CASTING RELATIVELY PIVOTAL ELEMENTS AROUND SPHERICAL BEARING MEMBERS

Adam D. Goettl, Phoenix, Ariz.

Application July 31, 1958, Serial No. 753,856

15 Claims. (Cl. 18—36)

This invention relates to a means and method for casting relatively pivotal elements around spherical bearing members and more particularly to a means and method for the production of louver slat assemblies by molding a plurality of intersecting slats about common spherical bearing members.

The present application is a continuation in part of my former patent application Serial No. 682,226, filed September 5, 1957, now abandoned, and another copending application Serial No. 679,296, filed August 20, 1957, now abandoned; the latter application is a continuation in part of a joint application of Adam D. Goettl and Gust Goettl, Serial No. 662,715, filed on May 31, 1957, now Patent 2,887,943.

Air directing louver devices such as those used at the outlets of air conducting conduits and evaporative coolers or the like, have been constructed of various materials and have assumed a great variety of mechanical configurations. Many of those louver slat assemblies have required considerable manual labor for assembling the intersecting slats relative to each other. It is desirable to produce louver slat assemblies wherein a plurality of intersecting slats may be produced in a mold such as those used to form various articles of plastic or other moldable materials.

Accordingly, it is an object of the present invention to produce a louver slat assembly having several angularly intersecting slats all formed concurrently about common bearing elements in a mold, whereby the slats when removed from the mold may be individually pivoted relative to each other about said bearing elements.

Another object of the invention is to provide a very simple means for supporting spherical bearing members in a molding die wherein intersecting slats may be molded around said bearing members.

Another object of the invention is to provide a method for the injection molding of plastic or other material around spherical bearing members to form an assembly of intersecting slats which are pivotal relative to each other and to the spherical bearing members when removed from the mold.

Another object of the invention is to provide a method for producing louver slat assemblies wherein hot material is injected around spherical bearing members to form intersecting slats; the method including cooling of the slats after molding, whereby the slats shrink around the spherical bearing members and thereby attain an intimate frictional engagement of the slats with the spherical bearing members.

Another object of the invention is to provide a mold means for producing louver slat assemblies having intersecting slats and spherical bearing members at the intersections of such slats, said mold having novel means for charging the intersections of the mold cavity with spherical bearing members preliminary to each injection molding operation.

Another object of the invention is to provide a means and a method for producing louver slat assemblies which will greatly reduce the manufacturing cost of louver slat assemblies and enhance such products to a considerable degree.

Another object of the invention is to provide a means and a method for producing louver slat assemblies which will produce very precise and attractive louver slat assemblies which may be used for a great variety of purposes.

A further object of the invention is to provide a novel product which may be produced by the method of the present invention, said product comprising relatively pivotal elements which are cast around spherical bearing members.

Other objects and advantages of the present invention may be apparent from the following specification, appended claims and accompanying drawings in which:

Fig. 1 is a side elevational view of a mold and screed box means in accordance with the present invention showing the screed box depositing spherical bearing members in the lower cavity of the mold and with the upper cavity of the mold raised above the screed box; portions of the molds shown broken away and in section, said means shown in Fig. 1 being adapted to carry out the method of the present invention.

Fig. 10 is a fragmentary sectional view of a further modification of dies used in the operation of the method of the present invention and;

Fig. 11 is a sectional view taken from line 11—11 of Fig. 10.

The structural features of the means disclosed in Figs. 1 to 7 of the drawings may be used in carrying out the method of the present invention as it relates to the production of louver slat assemblies by a molding process, whereby a complete assembly of intersecting louver slats may be produced by one molding operation and the slats in the assembly when molded are all individually pivotal relative to each other and to spherical bearing members contained at the intersections of the slats in said assembly.

Figure 1:
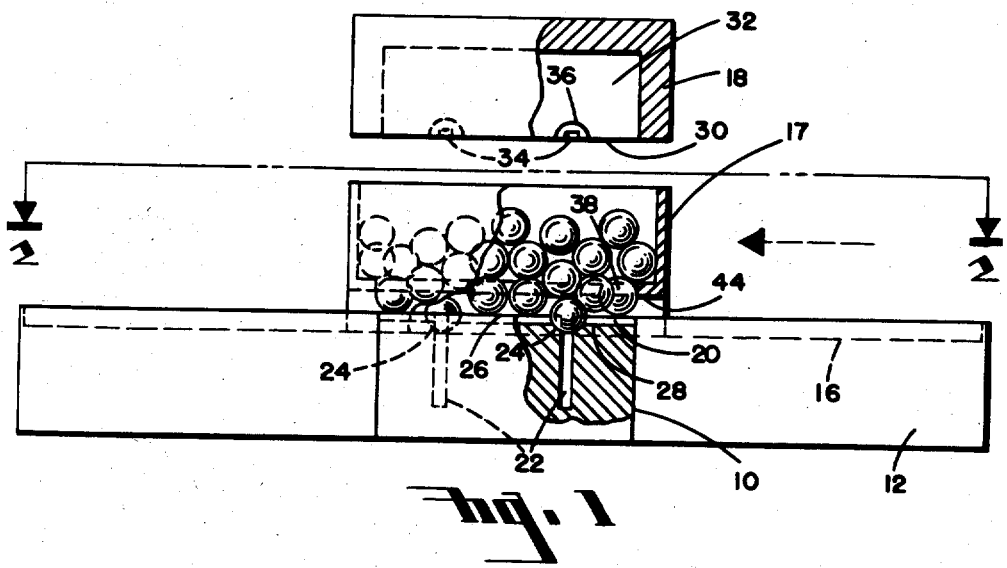

The means as shown in Fig. 1 of the drawing comprises a lower die member 10 having a base 12 provided with parallel tracks 14 and 16 which are disposed to guide a screed box 17 for charging cavities of the mold with spherical ball bearings. An upper die 18 is disposed to close upon the lower die 10 as shown in Figs. 4 and 5 of the drawings.

Figure 2:
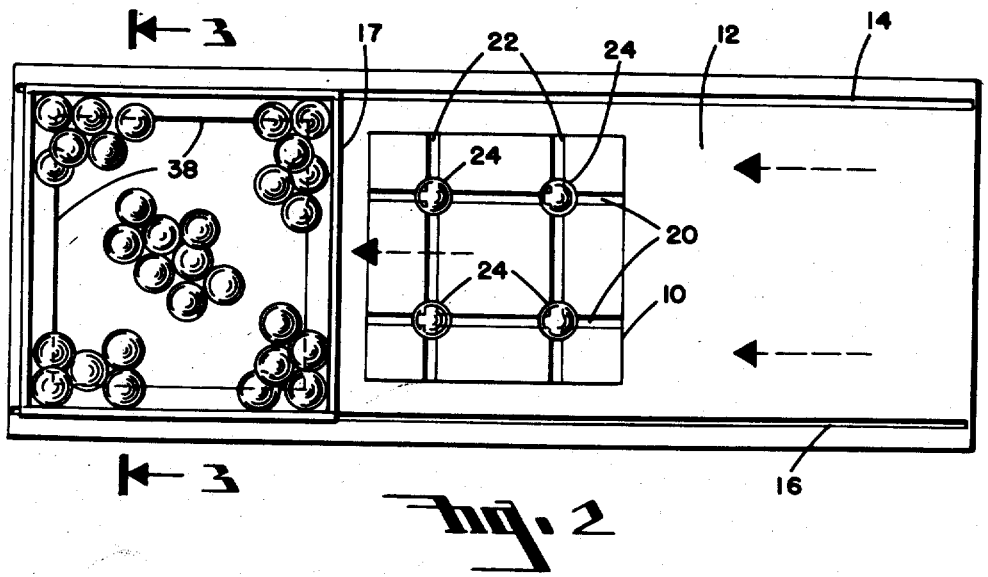
Fig. 2 is a view of the means disclosed in Fig. 1 of the drawings taken from the line 2—2 thereof and showing the screed box moved away from the position as shown in Fig. 1 to expose the cavities of the mold and to permit the upper half of the die to engage the lower half thereof preliminary to the injection of material around spherical bearing members in the mold.

The lower die as shown in Fig. 2 of the drawings is provided with slat molding recessed cavities 20 arranged in spaced parallel relationship to each other. Similar recesses molding cavities 22 in the die 10 intersect the cavities 20 at substantially right angles thereto and these molding cavities 22 are spaced similarly to the cavities 20. At the intersections of the cavities 20 and 22 are spherical bearing retaining recesses or sockets 24, which have greater breadth than the cavities in order to hold a spherical bearing member the diameter of which is greater than said breadth. As shown in Fig. 1 of the drawings the cavities 22 are quite deep while the cavities 20 are relatively shallow with respect to the upper surface 26 of the die 10. The upper surface being the parting plane between the dies 10 and 18. It will be seen that the centers of the spherical cavities 24 are on the parting plane or coincide with the upper surface 26 of the die 10. Thus, the lower extremities 28 of the cavities 20 extend slightly below the centers of the spherical recesses 24.

As shown in Fig. 1 of the drawing the cavities 22 and 34 are disposed to coincide with each other and form completed cavities. Thus, the cavities 22 and 34 are disposed to form common parts when material is injected thereinto. The cavities 22 constitute major portions of slot forming cavities while the cavities 34 serve as minor cavity portions.

Figures 4, 5:
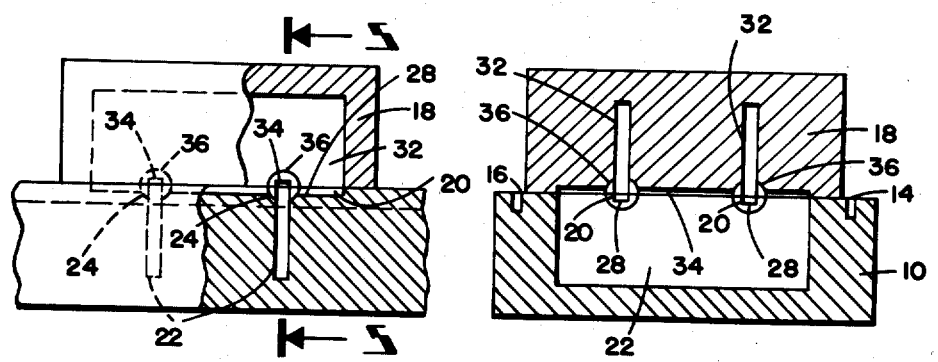
Fig. 4 is a side elevational view of the mold means of the present invention showing portions thereof broken away and in section to expose the mold cavities and showing the upper and lower elements of the mold contiguous to each other and ready to receive a charge of plastic or other suitable material for producing intersecting slats in the mold.
Fig. 5 is a sectional view taken from the line 5—5 of Fig. 4.

These cavities in the dies 10 and 18 are more clearly illustrated in Figs. 4 and 5 of the drawings. From an inspection of Fig. 5 it will be clear that the part forming cavities 22 coincide with the cavities 34 which cooperate to form complete cavities and the cavity portions 34 are disposed to extend the cavities 22 slightly beyond the centers of the recessed sockets 36 so that material of the parts formed in these cavities around spherical bearing members in the sockets or recesses 36 extend slightly more than one hundred eighty degrees in order to interlock the parts formed in the cavities relative to the spherical bearing members placed in the recesses 36. As shown in Fig. 5 of the drawings part forming cavities 32 are extended beyond the centers of the recesses 36 by registering cavity portions 28. Thus, the cavities 28 extend the cavities 32 and cooperate to form common part forming cavities which are separable about the centers of the recesses 36 thus permitting parts to be formed for more than one hundred eighty degrees about spherical bearings in the sockets 36 and also permitting the dies to be separated for the insertion of such spherical bearing members preliminary to the molding of plastic therearound. Thus, the cavity portions 32 form major part forming cavities in one die while the cavities 28 form minor portions of the part forming cavities and are disposed in the cooperating die.

Figures 6, 7:
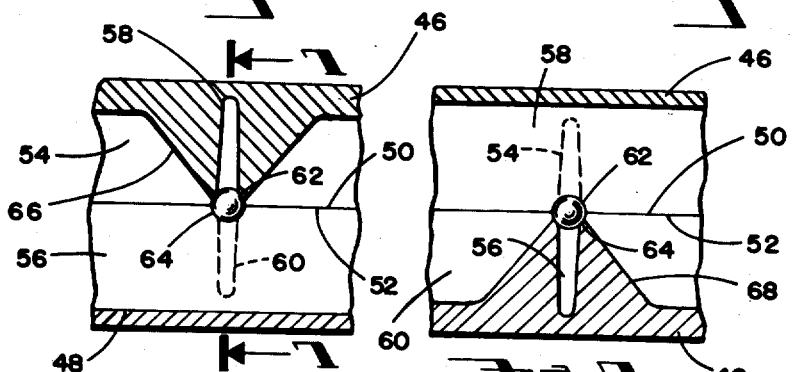
Fig. 6 is a sectional view of a mold similar to that as shown in Fig. 4 of the drawings but adapted to produce intersecting louver slats having substantially V-shaped notches similar to those disclosed in a co-pending application of Adam D. Goettl, Serial No. 662,715, filed May 31, 1957, for Air Directing Louver Device.
Fig. 7 is a fragmentary sectional view taken from the line 7—7 of Fig. 6.

As shown in Figs. 6 and 7 of the drawings, a major portion of each part forming cavity adjacent the spherical recesses is disposed in one die while a minor portion of the part forming cavity adjacent the spherical recesses is located in the other die. This structure is similar to that as shown in Figs. 4 and 5 of the drawings except that the minor portions of the cavities which extend beyond the parting line of the dies are provided with V shaped portions 66 and 68 in order to provide a notched form of the parts which may be made in the dies.

The die 18 is provided with a normally lower surface 30 adapted to rest upon the upper surface 26 of the die 10 and these surfaces 26 and 30 are at the parting plane between the dies 10 and 18. Extending upwardly and inwardly into the die 18 from the surface 30 are cavities 32 which coincide and register with the cavities 20 in the die 10. The cavities 32 are slat forming recessed cavities similar to the cavities 22 in the die 10. Cavities 34 in the die 18 are shallow cavities similar to the cavities 20 in the dies 10 and these cavities 34 coincide and register with the cavities 22 in the die 10. The cavities 34 extend slightly above the parting plane of the dies. At the intersections of the cavities 32 and 34 are spherical recesses 36 which coincide and register with the spherical recesses 24 in the die 10. Thus, the dies 10 and 18, when closed relative to each other as shown in Figs. 4 and 5 of the drawings, are capable of retaining spherical bearing members in the registering recess portions 24 and 36. The dies are provided with conventional plastic of fluid receiving openings not shown and which are no part of the present invention. These fluid receiving openings communicate with the cavities 20, 22, 32 and 34 in a manner conventional to practices well known in the plastic injection molding art or other arts of die casting various materials.

The screed box 17 is provided with an opening 38 in its lower portion and has side rail portions 40 and 48 which slide in the recessed tracks 14 and 16, respectively. These tracks as hereinbefore described are formed in the die support 12 and they support the lower die 44 of the screed box slightly spaced above the upper surface 26 of the die 10 a sufficient distance to clear spherical bearing members when they fall into the spherical recesses 24 in the die 10. The screed box 17 is sufficiently large to carry a considerable number of spherical bearing members and when the box is passed over the die 10 longitudinally of the tracks 14 and 16 spherical bearing members fall into the spherical recesses 24 and the lower surface 44 of the screed box clears these bearing members and carries the remaining bearing members along the upper surfaces of the die support 12 which coincides with the upper surfaces of the die 10. Thus, each time the screed box 17 is passed over the die 10 spherical bearing members are automatically deposited in the spherical recesses 24.

The method of the present invention includes the placement of spherical bearings in the die and then injecting or molding material in the form of slats which intersect each other at the spherical bearing members and causing the material to be formed around the bearing members so that the intersecting slats when molded are pivotally connected by the bearing members. During the injection of slat forming material into the die cavities the bearing members prevent the material in the cavities 32 from flowing into the cavities 22 and vice versa. Thus, the bearing members prevent the slats formed in the cavities 22 from becoming integral with the slats formed in the cavities 32 during the casting or molding of slats in the die cavities material which is contiguous to the bearing members becomes integral bearing portions of the formed slats. These bearing portions conform with the bearing surfaces of the bearing members and the bearing members thus become operating parts of the finished louver assembly which is ultimately removed from the dies. In the specific disclosure as shown, the intersecting cavities of the two dies extend beyond the centers of the bearing members when in the mold so that the slats when formed extend around the spherical bearing members slightly more than one hundred eighty degrees. This arrangement, however, is not essential to the production of intersecting louvers where only one hundred eighty degrees or less engagement of the slats with the spherical bearing members is required.

The method also includes the cooling and freezing of the slat material after injecting the material into the mold around spherical bearing members whereby cooling and freezing of the material causes contraction thereof around the bearing members thereby attaining frictional engagement of the formed slats with the bearing members after the material has cooled down. Thus, the louver slats of the assembly are formed to have sufficient frictional engagement with the spherical bearing members for holding the slats in adjusted position when angularly pivoted relative to each other.

Accordingly, it will be understood that the method simply comprises a placement of spherical bearing members in a mold and then molding intersecting louver slats at angular dispositions to each other in the mold and thereby forming the slats around the spherical bearings at the intersections of the slats.

Figure 3:
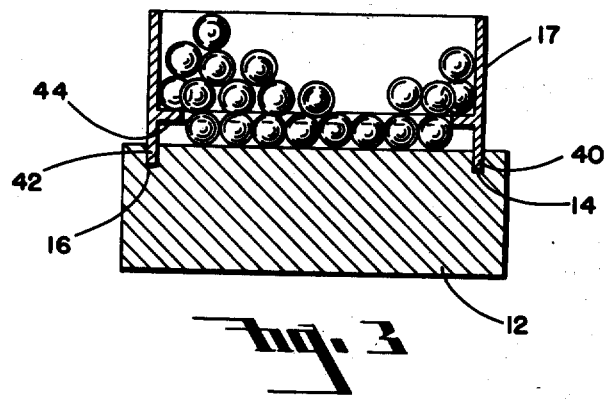
Fig. 3 is a transverse sectional view taken from the line 3—3 of Fig. 2.

In the modification as shown in Figs. 6 and 7 of the drawings dies are shown to contain cavities which are capable of forming louver slats of a configuration shown in Figs. 3 and 4 of applicant's copending application, Serial No. 662,715, filed May 31, 1957, for Air Directing Louver Device.

As shown in Figs. 6 and 7 of the drawings dies 46 and 48 are upper and lower dies, respectively, having lower and upper surfaces 50 and 52, respectively, which form the parting plane for the two dies. The die 46 is provided with a plurality of slat forming cavities 54 which coincide and register with slat forming cavities 56 in the die 48. The die 46 is also provided with a plurality of slat forming cavities 58 which are disposed at substantially right angles to the cavities 54 and these cavities 58 in the die 46 coincide and register with slat forming cavities 60 in the die 48. At the intersections of the recessed slat forming cavities 54 and 58 are spherical recesses 62 which coincide and register with spherical recesses 64 at the intersections of the slat forming cavities 56 and 60 in the die 48. It will be seen that the slat forming cavities 54 have substantially V-shaped inward projections 66 adapted to form V-shaped notches in slats formed in the cavities 54 and 56 while the cavities 60 are also provided with substantially V-shaped projections 68 adapted to form substantially V-shaped notches in the slats molded in the cavities 58 and 60. It will be understood that the spherical recess portions 62 and 64 are adapted to hold spherical bearing members therein when the dies are closed so that intersecting louver slats may be molded in the intersecting cavities of the dies 46 and 48 whereby the dies when opened relative to each other contain a unitary assembly of louver slats which may be readily removed from the dies. These intersecting louver slats are then all freely pivotal relative to each other about the axes of the spherical bearing members and the shrinkage of the plastic or other material when it freezes causes frictional engagement of the slats with the spherical bearing members.

Figure 8:
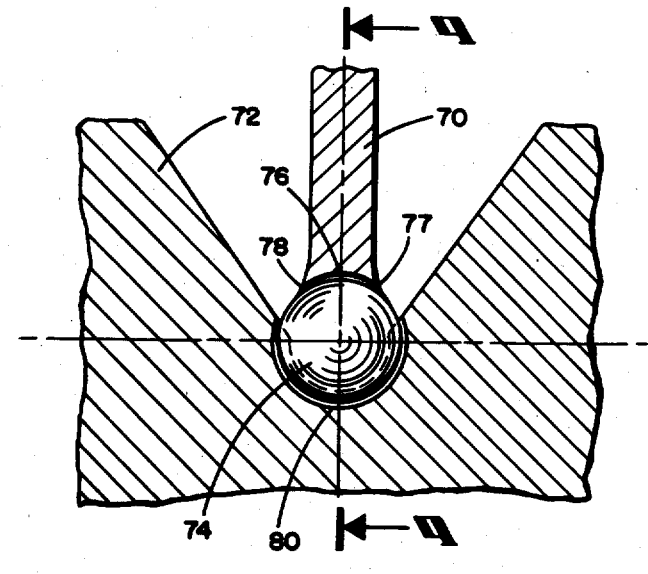
Fig. 8 is an enlarged fragmentary sectional view of a pair of relatively pivotal elements which are cast about a spherical bearing member in accordance with the present invention.
Figure 9:
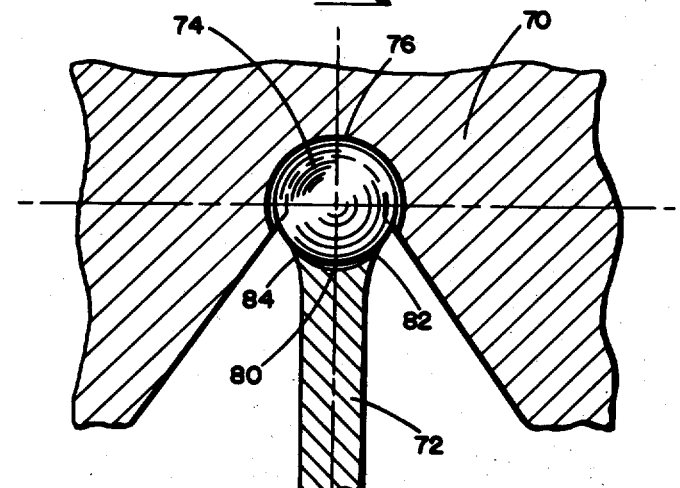
Fig. 9 is a fragmentary sectional view taken from the line 9—9 of Fig. 8.

As shown in Figs. 8 and 9 the product produced in accordance with the method of the present invention may include assemblies of intersecting louver slats or the products may be any pair of relatively pivotal elements which are interconnected by a spherical bearing member. As will be hereinafter pointed out, the product has certain physical features which are formed in accordance with the method of the invention and it has been discovered that these features are particularly useful to provide pivotal connections for relatively pivotal parts.

As shown in Fig. 8 of the drawing, a pair of relatively pivotal elements such as air directing louver slats are interconnected by a spherical bearing member. The relatively pivotal elements are shown in these figures and are in the form of louver slats 70 and 72 which have been molded about a spherical bearing member 74 at the intersecting portions of the slats.

The thickness of these slats is less than the diameter of the spherical bearing member 74.

The material of the slats is molded around the spherical bearing member at the middle portion 76 of the slat adjacent the bearing member 74. The outer edges 77 and 78 also shrink toward the middle of the slat and thus they contract toward the middle of the spherical bearing member and grip the spherical surface thereof to attain frictional engagement therewith. It will be seen that the edges 77 and 78 contact the spherical bearing member while the middle portion 76 is spaced therefrom.

This structural arrangement provides for a smooth pivotal relationship between the intersecting slats and the spherical bearing member due to the fact that it tends to alleviate any excessive radial differential in spherical bearing contact. This is known to be essential to smooth operation of spherical bearing members when sliding in conforming bearing supports.

It is notable that the present invention provides a method which produces this desirable mechanical configuration of bearing structure when the relatively pivotal elements are cast in a mold around spherical bearing members. It will be seen that the slat 72 is similar to the slat 70 in that the middle portion 80 of the slat 72 is shrunk away from the surface of the spherical bearing member 74 and that the outer edges 82 and 84 of the slat 72 firmly engage the spherical bearing member 74.

It will be appreciated by those skilled in the art that relatively pivotal elements may be easily cast in a mold about spherical bearing members and that various materials may be used for producing such structures. It is known that plastics are readily usable in injection molds and that materials having different hardness may provide for varying degrees of frictional loading of the pivotal elements on the spherical bearings when the elements are cast around the spherical bearing members.

In the modification as shown in Figs. 10, 11, 12 and 13 means is provided to cast or mold basket weave louver slat assemblies wherein bearing elements initially placed in the mold prevent intersecting slats from becoming integral with each other and form pivotal bearing elements of the finished louver slat assembly. In this modification the dies are provided with cavities so arranged to mold louver slats which interconnect each other and form a basketweave structure. These dies are provided with intersecting cavities having bearing recesses at the intersections and these bearing recesses are disposed to extend into the cavities a distance which approximates one hundred eighty degrees or less whereby the basket weave structure produced in the cavities of the dies includes interwoven mutually supporting slats which retain the bearing elements therebetween.

As shown in Fig. 10 of the drawings, dies 90 and 92 engage each other at faces 94 and 96, respectively. These faces form a parting line for the dies wherein slat forming cavities 98 and 100 intersect each other at substantially right angles. It will be seen that a portion 102 of the cavity 98 is disposed in the die 92 while a portion 104 of the cavity 98 is disposed in the die 90. Thus, the cavity 98 is staggered with respect to the faces 94 and 96 of the dies 90 and 92 thereby disposed to form a slat having V-shaped notches alternately disposed in opposite edges thereof. These cavities 98 at their intersections with the cavities 100 are provided with recess portions 106 and 108 disposed in the dies 90 and 92, respectively, and disposed to support a bearing element therein which fills the intersections of the cavities 98 and 100 to prevent material injected into these cavities from flowing together. Thus, material injected into the cavities 98 cannot flow into the cavities 100 at their intersections due to the disposition of bearing elements A which are held in the conforming recess portions 106 and 108 in the dies 90 and 92. The recesses 106 and 108, as shown, are spherical recesses having a center disposed to align with the faces 94 and 96 of the dies 90 and 92, respectively, which as hereinbefore described form a parting line for the dies. It will be noted that the recessed portions 106 may engage only approximately one hundred eighty degrees of the bearing members A while the recesses 108 may engage only approximately one hundred eighty degrees of the spherical bearing members A. The slat assembly when cast in the dies 90 and 92 around the spherical bearing members A is eld in assembly by the bearings in the notches alternately disposed in opposite edges of the slats and whereby the slats are held adjacent to each other at their edges by the interwoven or interdigitated relationship of the slats. Thus, bearing elements A cannot be displaced from the slat assembly when cast in the dies 90 and 92 around the bearing members A.

It will be seen that the spherical recesses 106 and 108 at the intersections of the cavities 98 and 100 are only segmental portions of spherical recesses and these segmental portions are bounded by the planes of the cavities 98 and 100. Thus, some of the spherical recesses 106 at the segmental planes thereof are disposed at substantially ninety degrees relative to some of the other recesses 106 of adjacent intersections of the cavities 98 and 100. Likewise, segmental portions of the recesses 108 are disposed at substantially ninety degrees to each other at adjacent intersections of the cavities 98 and 100.

From the foregoing description of the modification as shown in Figs. 10 to 13, inclusive, it will be seen that a basket weave assembly of relatively pivoted intersecting slats may be cast as a unitary structure in that bearing elements disposed at the intersections of the die cavities prevent the material from flowing together at the intersections of the cavities thereby permitting intersecting slats to be cast concurrently about the bearing members without becoming integral with each other whereupon removal of the slats from the die permits relative pivotal action of the slats around the bearing members cast therebetween.

Further, it will be seen that the dies are so disposed that material may be cast about the spherical bearing members for a distance of one hundred eighty degrees or less about the circumference of the bearing members and that these bearing members may be retained between the slats due to their mutually supporting interdigitated relationship.

It will be obvious to those skilled in the art that various modifications of the present invention may be resorted to in a manner limited only by a just interpretation of the following claims.

I claim:

1. A method of forming a plurality of relatively pivoted angularly intersecting slat members, and to produce a pivotal bearing means between said slat at points of intersection of said slats; including the steps of placing a bearing member in a die at locations coinciding with said points of intersection of the slats to be formed, then injecting material in said die and casting intersecting slats in said die and forming bearing portions of said slats around said bearing member while utilizing said bearing member to prevent the injected material forming one slat from flowing into and becoming integral with material forming an intersecting slat.

2. A method of forming a plurality of relating pivoted angularly intersecting slat members, and to produce a universal joint between said slats at their intersecting portions including the steps of placing a spherical bearing member in a die at locations coinciding with intended intersecting portions of the slats to be formed, then injecting material in said die and casting intersecting slats in said die and permitting the material forming each slat to flow slightly more than 180 degrees around said spherical bearing member while utilizing said bearing member to prevent the injected material forming one slat from flowing into and becoming integral with material forming an intersecting slat.

3. A method of forming a plurality of relatively pivoted angularly intersecting slats and to produce a pivotal bearing means between said slats at their intersecting portions; including the steps of preparing angularly intersecting slat molding cavities in a die, placing a bearing member in said die at the intersection of said cavities and then injecting material into said cavities thereby casting slats in said cavities and forming pivotal portions on said slats contiguous to said bearing member while utilizing said bearing member at said intersections to prevent the material injected into some of the slat molding cavities from flowing into and becoming integral with the material in the slat molding cavities angularly intersecting them.

4. A method of forming a plurality of relatively pivoted angularly intersecting slats and to produce a universal joint between said slats at their intersecting portions; including the steps of preparing angularly intersecting slat molding cavities in a die, placing a universal bearing member in said die at the intersection of said cavities and then injecting material into said cavities thereby casting slats in said cavities and forming pivotal bearing portions on said slats contiguous to said bearing member while utilizing said universal bearing member at said intersections to prevent the material injected into some of the slat molding cavities from flowing into and becoming integral with the material in the slat molding cavities angularly intersecting them thereby attaining an independent pivotal connection of each slat with said bearing member, whereby the bearing member is assembled between the cast slats to provide a universal joint for the slats at their intersecting portions.

5. In a means for producing assemblies of pivoted parts the combination of: first and second dies having first and second part forming cavities therein, said first and second part forming cavities intersecting each other at an angle, said first and second dies provided with respective first and second opposed coinciding recesses substantially centered at the intersecting portions of said cavities, said recesses adapted to hold a ball shaped spherical bearing member and being wider than the cavities of said dies, the centers of said recesses being on a plane at which said dies part; a major portion of said first cavity, at said recesses, being in said first die; a major portion of said second cavity, at said recesses, being in said second die; a minor portion of said first cavity, at said recesses, being in said second die; and a minor portion of said second cavity, at said recesses, being in said first die; thus minor portions of said first and second cavities, at said recesses, extend beyond said plane thereby permitting the material of each part, when formed in said dies, to extend more than one hundred eighty degrees around a spherical bearing member in said recesses.

6. In a means for producing assemblies of pivoted parts the combination of: first and second dies having first and second part forming cavities therein, said first and second part forming cavities intersecting each other at an angle, said first and second dies provided with respective first and second opposed coinciding recesses adapted to hold a ball shaped spherical bearing member and being wider than the said cavities, the centers of said recesses being on a plane at which said dies part; a major portion of said first cavity, at said recesses, being in said first die and a minor portion of said first cavity, at said recesses, being in said second die; a major portion of said second cavity, at said recesses, being in said second die; and a minor portion of said second cavity, at said recesses, being in said first die; thus minor portions of said first and second cavities, at said recesses, extend beyond said plane thereby permitting the material of each part, when formed in said dies, to be extended more than one hundred eighty degrees around a spherical bearing member in said recesses; wherein said material effects pivotally gripping, straddling engagement with said bearings characterized by a slight clearance between each bearing and the material intermediate the straddling portions thereof which grip the bearings.

7. In a means for producing assemblies of pivoted parts the combination of: first and second dies having first and second part forming cavities therein; said first and second part forming cavities intersecting each other at an angle, said first and second dies provided with respective first and second opposed coinciding recesses at the intersecting portions of said cavities, said recesses adapted to hold a ball shaped spherical bearing member, the centers of said recesses being on a plane at which said dies part; said recesses having a greater breadth than said cavities in order to accommodate a spherical bearing member having a diameter greater than the breadth of said cavities; a major portion of said first cavity, at said recesses, being in said first die and a minor portion of said first cavity, at said recesses, being in said second die; a major portion of said second cavity, at said recesses, being in said second die; and a minor portion of said second cavity, at said recesses, being in said first die; thus minor portions of said first and second cavities, at said recesses, extending beyond said plane thereby permitting the material of each part, when formed in said dies, to extend more than one hundred eighty degrees around a spherical bearing member in said recesses.

8. In a means for producing assemblies of pivoted parts, the combination of: first and second dies having first and second part forming cavities intersecting each other at an angle, said first and second dies provided with respective first and second opposed, coinciding recesses intersecting portions of said cavities and substantially centered at the intersecting points of the cavities of said dies, said recesses being wider than the thickness of the parts to be molded in said cavities and adapted to hold a bearing member to become part of the finished product, the centers of said recesses being on a plane at which said dies part; a major portion of said first cavity, at said recesses, being in said first die, and a minor portion of said first cavity, at said recesses, being at said second die; a major portion of said second cavity, at said recesses, being in said second die, and a minor portion of said second cavity, at said recesses, being in said first die; thus minor portions of said first and second cavities, at said recesses, extend beyond said plane, thereby permitting the material of each part when formed in said dies to straddle said bearings to an extent effecting a gripping relation between said material and said bearings.

9. In a means for producing assemblies of pivoted parts, the combination of: first and second dies having first and second part forming cavities therein; said first and second part forming cavities intersecting each other at an angle, said first and second dies provided with respective first and second opposed coinciding recesses at the intersecting portions of said cavities, said recesses adapted to hold respective bearing members, the centers of said recesses being on a plane at which said dies part; said recesses having a greater breadth than said cavities in order to accommodate a bearing member having a breadth greater than the breadth of said cavities, a major portion of said first cavity, at said recesses, being in said first die, and a minor portion of said first cavity, at said recesses, being in said second die; a major portion of said second cavity, at said recesses, being in said second die, and a minor portion of said second cavity, at said recesses, being in said first die; thus minor portions of said first and second cavities, at said recesses, extending beyond said plane thereby permitting the material of each part, when formed in said dies, to extend into gripping engagement with said bearing members in said recesses.

10. A method of manufacturing a slat type grid comprising two sets of slats wherein the sets of slats are angularly disposed with respect to each other, which comprises preparing an array of bearing elements in the form of a grid, molding two sets of slats with spaced notches in the edges thereof so that the sets are angularly disposed with respect to each other, and the notches of one set are intersected with respective notches of the other set and wherein the lines of intersection register with the positioning of the grid array of said bearing elements, said slats being molded in contiguity with said bearing elements, so that each bearing element is particularly straddled by a portion of the material forming the edges of the notches of a pair of angularly related slats.

11. A method for producing assemblies of pivoted slats comprising; the placement of a spherical bearing member in a die; then introducing material into the die around said bearing member and permitting it to form angularly related diametric slats which intersect about said bearing member; and then permitting the edges of said slats in contact with said bearing member to cool rapidly and to contract into frictionally engaged relation with said bearing member while cooling of the masses at the middle portions of said edges causes the material thereof to contract away from said bearing member and thereby attain slight clearance of said middle portions relative to said bearing member.

12. A method of forming a plurality of relatively pivoted adjacent parts, and to produce a pivotal bearing means between said parts at their adjacent portions; including the steps of placing a bearing member in a die at locations coinciding with intended adjacent portions of the parts to be formed, then injecting material in said die and concurrently casting adjacent parts in said die and forming bearing portions of said parts around said bearing member while utilizing said bearing member to prevent the injected material forming one part from flowing into and becoming integral with material concurrently forming an adjacent part.

13. A method of forming a plurality of relatively pivotally united and independently positionable intersecting slats, comprising the steps of positioning a plurality of spherical bearing elements at the intended points of intersection of said slats, injecting a slat forming material to form the slats where the bearing elements act to maintain the slats independent of each other and with the material forming the slats encompassing the elements so that the slats are connected in pivotal relation.

14. A method of forming a plurality of relatively pivotally associated independent slat elements comprising the steps of positioning a plurality of spherical bearing elements at the intended points of intersection of the slats, moulding a slat forming material with relation to said bearing elements where the bearing elements act to maintain the slat forming material of each slat independent and so that the slat forming material of each slat encompasses a portion of the spherical ball bearing element, so that when the slats are formed they are connected in mutually pivotal relation around the bearing elements.

15. A method of forming a plurality of independent swingable slats comprising the steps positioning a plurality of bearing elements at the intended points of intersection of said slats, moulding a slat forming material to form the slats with relation to said bearing elements where the bearing elements act to stop the slat forming material during the moulding to maintain the slats independently formed with relation to each other and so that the moulded material of the slats encompasses the bearing element to form a pivotal connection between the independently formed slats to connect the slats in mutual pivotal relation through the medium of the bearing elements.

References Cited in the file of this patent

UNITED STATES PATENTS

| | | |
|---|---|---|
| 2,660,151 | Smith et al. | Nov. 24, 1953 |
| 2,768,415 | Morin | Oct. 30, 1956 |